US012581405B2

(12) United States Patent

Li et al.

(10) Patent No.: US 12,581,405 B2

(45) Date of Patent: Mar. 17, 2026

(54) METHOD AND SYSTEM FOR INCREASING ENERGY EFFICIENCY IN A WIRELESS NETWORK

(71) Applicant: Hewlett Packard Enterprise Development LP, Spring, TX (US)

(72) Inventors: Kuanyue Li, Beijing (CN); Hailong Bai, Beijing (CN); Hongli Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 539 days.

(21) Appl. No.: 18/102,505

(22) Filed: Jan. 27, 2023

(65) Prior Publication Data

US 2024/0259937 A1 Aug. 1, 2024

(51) Int. Cl.
  *H04W 52/02* (2009.01)
  *H04W 48/20* (2009.01)

(52) U.S. Cl.
  CPC ....... *H04W 52/0206* (2013.01); *H04W 48/20* (2013.01)

(58) Field of Classification Search
  CPC . H04W 52/0206; H04W 48/20; H04W 24/02;
  H04W 16/20
  See application file for complete search history.

(56) References Cited

U.S. PATENT DOCUMENTS

| | | | | |
|---|---|---|---|---|
| 7,366,169 B1 * | 4/2008 | Backes | ................. | H04W 48/20 |
| | | | | 455/434 |
| 7,729,325 B2 | 6/2010 | Gopalakrishnan et al. | | |

| | | | | |
|---|---|---|---|---|
| 10,979,913 B2 | 4/2021 | Tofighbakhsh et al. | | |
| 11,368,857 B1 | 6/2022 | Kalavakuru et al. | | |
| 2020/0322814 A1 * | 10/2020 | Tofighbakhsh | ....... | H04W 24/02 |
| 2020/0383049 A1 * | 12/2020 | Tellado | ................. | H04W 24/04 |
| 2020/0393885 A1 * | 12/2020 | Ghosh | ..................... | G06F 1/206 |
| 2020/0395683 A1 * | 12/2020 | Cao | ...................... | H01Q 3/2605 |
| 2021/0176670 A1 * | 6/2021 | Keskitalo | .............. | H04L 5/0048 |
| 2022/0029892 A1 * | 1/2022 | Hooli | ...................... | H04L 41/16 |

(Continued)

OTHER PUBLICATIONS

Aruba, "Aruba 500 Series Wireless Access Points," Cost-effective Wi-Fi 6 (802.11ax) for medium-density indoor environments, Data Sheet, 2020, 9 pages.

(Continued)

*Primary Examiner* — Nizar N Sivji

(74) *Attorney, Agent, or Firm* — Yao Legal Services, Inc.

(57) ABSTRACT

A system and method for configuring a plurality of access points (APs) providing service coverage to a space is described. The system determines a number of users in the space. Responsive to the number of users exceeding a predetermined threshold, the system can place the plurality of APs in a high-power mode and cause an antenna of each AP to operate in a narrow-beam mode. Responsive to the number of users being below the threshold, the system selects a subset of APs from the plurality of APs and causes an antenna of each AP in the subset to operate in a wide-beam mode. Each AP in the subset remains in the high-power mode, and the wide-beam mode has a wider radiation pattern in a horizontal plane than the narrow-beam mode. The system places the remaining APs in a power-saving mode, thereby reducing energy consumption while maintaining service coverage.

20 Claims, 9 Drawing Sheets

(56)     References Cited

U.S. PATENT DOCUMENTS

| | | | | |
|---|---|---|---|---|
| 2022/0030515 A1* | 1/2022 | Berger | ............. | H04W 52/0206 |
| 2022/0225115 A1* | 7/2022 | Kalavakuru | ......... | H04B 17/391 |
| 2023/0239854 A1* | 7/2023 | Newman | ............... | H04B 7/043 |
| 2024/0107347 A1* | 3/2024 | Pirmagomedov | ..... | H04L 1/0023 |
| 2024/0365155 A1* | 10/2024 | He | ....................... | H04W 24/08 |

OTHER PUBLICATIONS

Wu et al., "Energy-Efficient Base-Stations Sleep-Mode Techniques in Green Cellular Networks: A Survey", IEEE Communication Surveys & Tutorials, vol. 17, No. 2, Feb. 12, 2015, pp. 803-826.

* cited by examiner

100

VERTICAL-PLANE BEAM PATTERN

HORIZONTAL-PLANE BEAM PATTERN

METHOD AND SYSTEM FOR INCREASING ENERGY EFFICIENCY IN A WIRELESS NETWORK

BACKGROUND

Field

This disclosure is generally related to the antenna of a wireless access point (AP). More specifically, this disclosure is related to an AP antenna design that can increase the energy efficiency of an access network.

BRIEF DESCRIPTION OF THE FIGURES

In the figures, like reference numerals refer to the same figure elements.

DETAILED DESCRIPTION

Figure 1A:
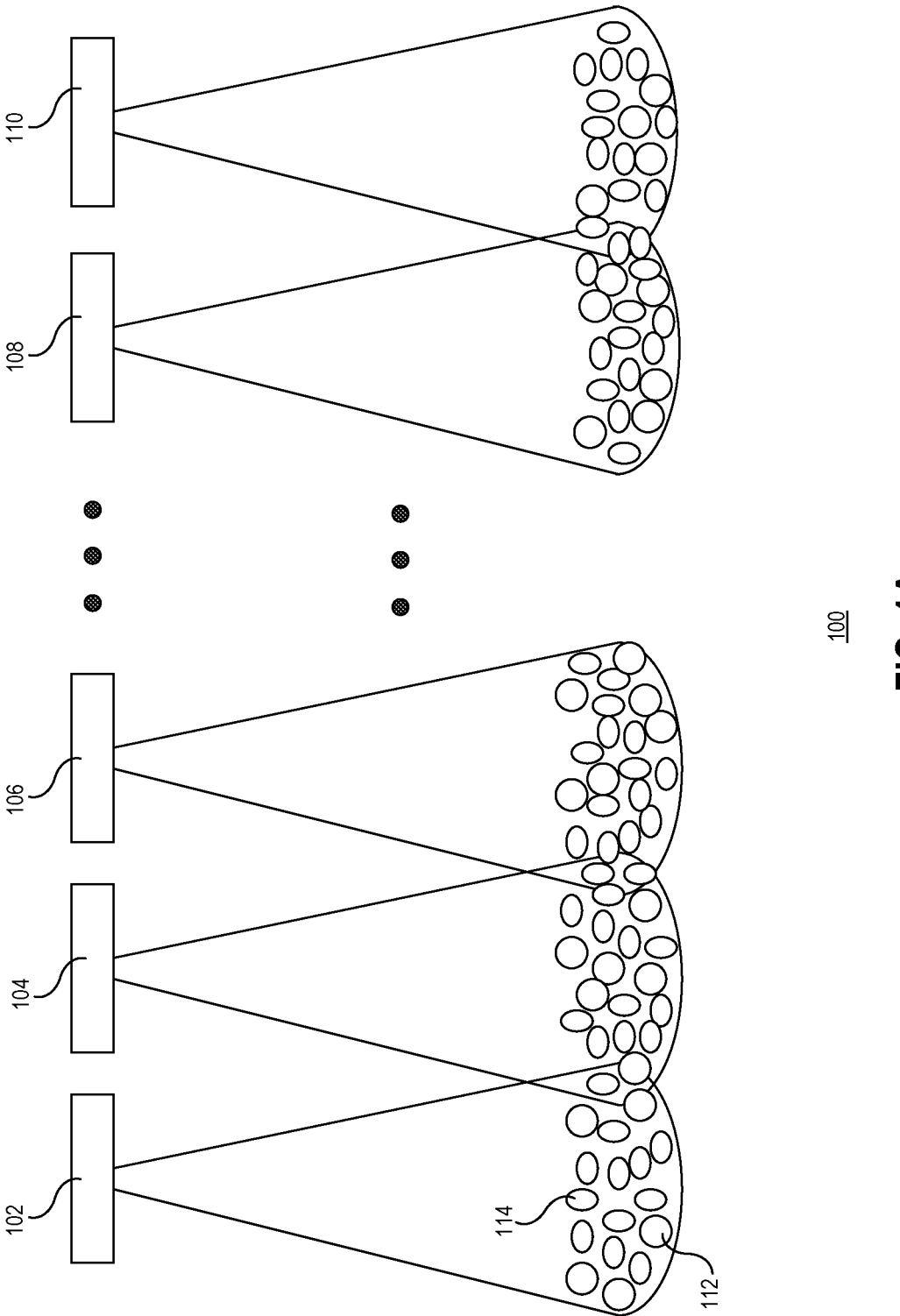
FIG. 1A illustrates an example of a high user-density scenario, according to one aspect of the instant application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

In recent years, mobile device users have enjoyed and are expecting the convenience of connecting to the Internet via Wi-Fi because of the increased prevalence of Wi-Fi networks in many locations (e.g., homes, offices, commercial locations, public venues). However, providing Wi-Fi coverage to users in large open spaces (e.g., plazas, stadiums, concert halls, convention centers, etc.) can still be a challenge. Covering every square foot of a large open area requires the deployment of a large number of wireless access points (APs). Moreover, some public spaces may also experience high user density, meaning that many users may be in the coverage area of a single AP. Although in theory an AP can support over 100 users, having that many users sharing the AP can result in poor user experience as the service quality can deteriorate with the increased number of users. Newly developed APs (e.g., APs according to Wi-Fi 6E and Wi-Fi 7 standards) can support more users than earlier version APs by using antennas with narrower beams. However, APs with narrow-beam antennas provide smaller coverage area than APs with wide-beam antennas, meaning that compared with older APs with wider beams, more narrow-beam APs would be needed to provide coverage to a large open space with a high user density. Each AP needs power to operate, and more APs means a higher level of energy consumption.

In many practical scenarios, the number of users in a large open space accessing the Wi-Fi network can fluctuate, depending on the time of the day, the day of the week, or the presence of an event. For example, the number of users in a transportation terminal (e.g., bus stops, subway stations, or airport terminals) can fluctuate based on the arrival and departure schedule of the vehicles, and the number of users in a concert hall or stadium may depend on whether an event is taking place and the attendance rate of the event. Keeping all APs on at all times may waste energy when the user density is low. However, turning off some APs when the user density is low may result in blind spots (i.e., areas without or with low-intensity Wi-Fi signals).

To reduce unnecessary energy consumption while ensuring sufficient service coverage, according to some aspects, APs with configurable antenna beams can be deployed in a large open space. More specifically, the beam pattern of the APs' antennas can be configurable based on the instant user density. When the user density is high, the APs' antennas can be configured to operate in a narrow-beam mode such that each AP can provide Wi-Fi services to many users in a smaller area; when the user density is low, a subset of APs can have their antennas configured to operate in a wide-beam mode such that each AP can provide coverage over a wider area, and the remaining APs can be placed in a power-saving or deep-sleep mode, thus providing significant power savings.

FIG. 1A illustrates an example of a high user-density scenario, according to one aspect of the instant application. FIG. 1A shows that a number of APs 102-110 are deployed in a large open space 100. Each AP can be configured to provide Wi-Fi service to a large number (e.g., above 20) of users within the coverage area of its antenna. For example, AP 102 provides service to a group of users, including users 112 and 114. According to some aspects, the antenna of each AP can be configured to have a relatively narrow (e.g., less than 45°) beam width in both the horizontal plane and the vertical plane. According to one aspect, the horizontal-plane beam width of the antenna can be about 30°. The vertical-plane beam width of the antenna can be similarly narrow (e.g., about 30°). By strategically placing the APs in open space 100 (e.g., to ensure that the entirety of open space 100 can be covered) and by configuring the antenna of each AP in the narrow-beam mode, one can ensure that a large number of users in open space 100 can receive high-intensity Wi-Fi signals. In other words, users can access the Internet using Wi-Fi even when they are in a densely packed concert hall or football stadium.

Figure 1B:
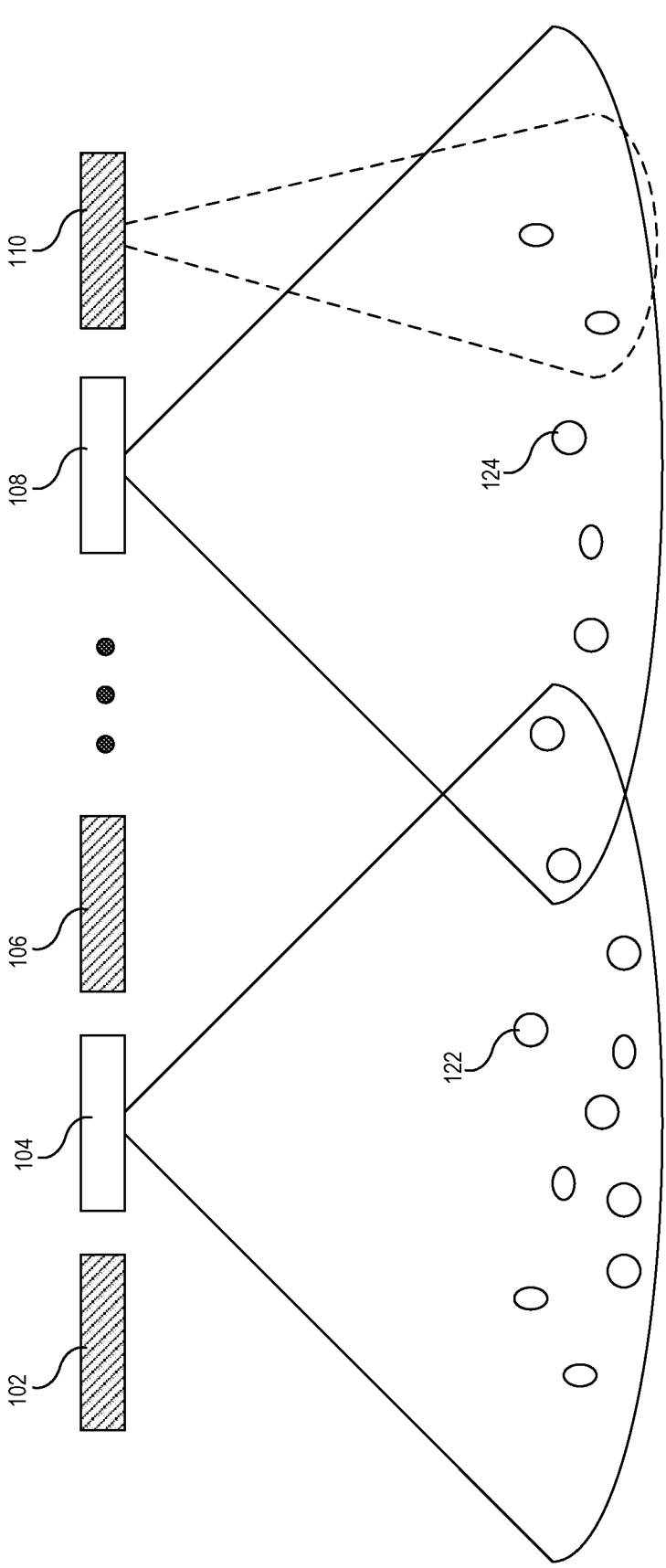
FIG. 1B illustrates an example of a low user-density scenario, according to one aspect of the instant application.

As discussed previously, providing power to all the APs at all times can be expensive. When there are fewer users needing to access the Wi-Fi network, keeping all APs in the normal-operation or high-power mode can be wasteful. FIG. 1B illustrates an example of a low user-density scenario, according to one aspect of the instant application. As can be seen in FIG. 1B, a few users (e.g., users 122 and 124) are scattered in large open space 100, in which APs 102-110 are deployed. If all APs are powered up with their antennas operating in the narrow-beam mode, each AP will support a very low number of users. FIG. 1B shows a hypothetical scenario, in which AP 110 provides services to only two users with its antenna configured to operate in the narrow-beam mode. The underutilization of the APs can result in the waste of electrical power. To reduce the overall power consumption, according to some aspects, a subset of APs can be placed in a deep-sleep or power-saving mode, in which an AP has most of its functions turned off (e.g., having the amplifiers and transmitters turned off). In the example shown in FIG. 1B, APs 102, 106, and 110 have been placed in the deep-sleep mode, meaning that they no longer provide Wi-Fi services to users. The other APs (e.g., APs 104 and 108) remain in the normal- or high-power mode and have their antennas operating in the wide-beam mode to provide coverage.

The number of APs that are placed in the deep-sleep mode can be configurable. More power can be saved if more APs are placed in the deep-sleep mode. The number of APs placed in the deep-sleep mode can be limited by the required coverage, because the remaining active APs operating in the high-power, wide-beam mode should be able to provide sufficient coverage to the open space. According to one aspect, the wide beam is three times as wide as the narrow beam, meaning that it can cover three times the space compared with the narrow-beam. Consequently, approximately ⅔ (or 66%) of the APs can be placed in the deep-sleep mode such that power savings of over 60% (e.g., up to 66%) can be achieved. In the example shown in FIG. 1B, the APs can be divided into groups of three APs, with two APs in each group being placed in the deep-sleep mode. Other configurations are also possible. For example, the positions of the users in open space 100 may be determined based on signals (e.g., discovery signals) transmitted by their terminal devices (e.g., mobile phones) or based on their coupled APs, and a number of APs can be selected and placed in the deep-sleep mode based on the positions of the users. In one example, the total number of users may be low, but these users are crowded into a particular small region. In such a case, APs surrounding that region may all be placed in the high-power mode, as more APs are needed to provide Wi-Fi services to the users in this region.

To continue to provide coverage over the entire area within open space 100 when some APs are placed in the deep-sleep mode, the antenna of each of the remaining active APs can be configured to operate in a wide-beam mode. According to some aspects, the antenna of each remaining active AP can be configured to have a relatively wide (e.g., more than 60°) beam width in the horizontal plane. According to one aspect, the horizontal-plane beam width of the wide-beam mode can be approximately three times as large as that of the narrow-beam mode. If the beam width of the narrow-beam mode is 30°, the beam width of the wide-beam mode can be 90°. On the other hand, the vertical-plane beam width of the antenna can be the same for both modes (e.g., about 30°).

Figure 2:
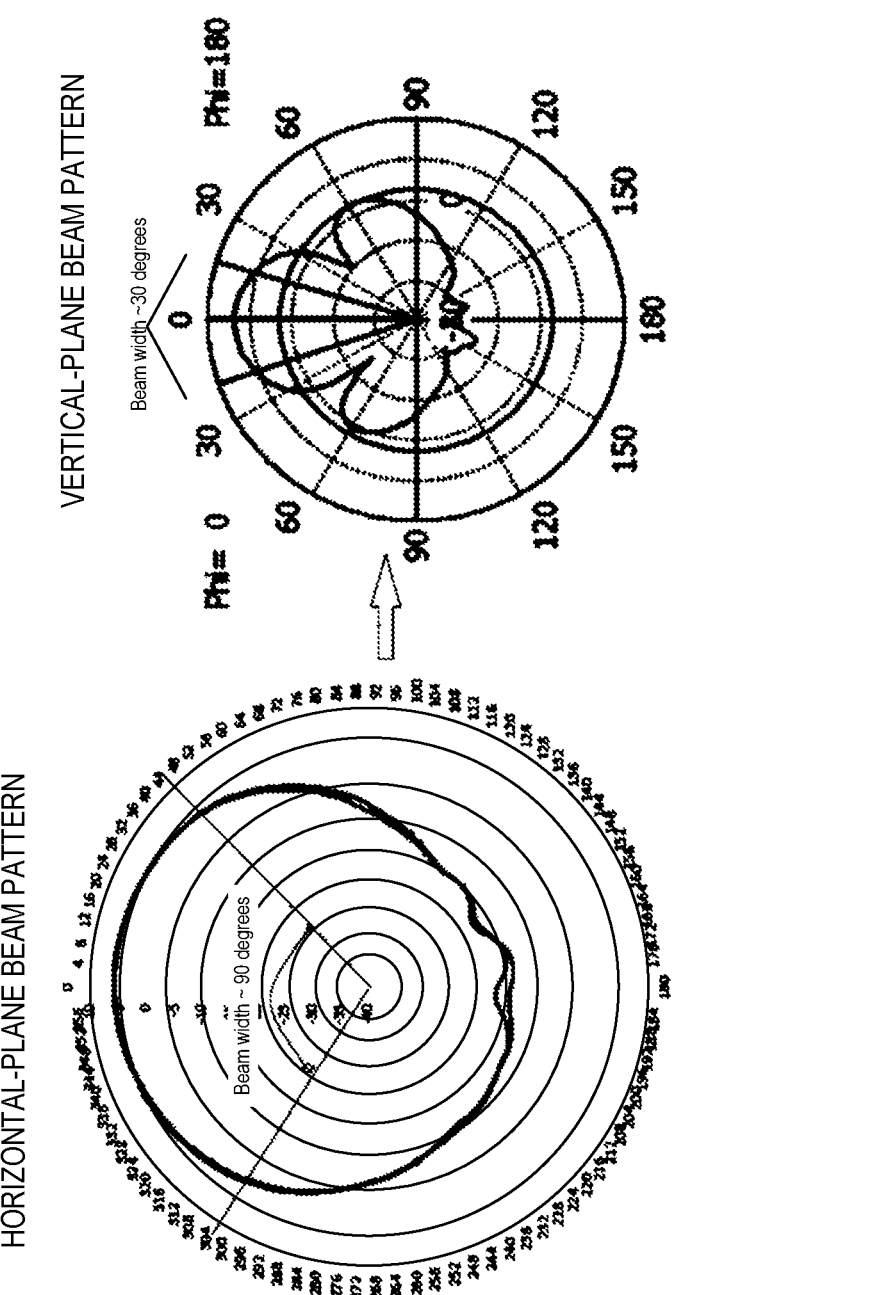
FIG. 2 illustrates beam patterns of an antenna when it is operating in the wide-beam mode, according to one aspect of the instant application.

FIG. 2 illustrates beam patterns of an antenna when it is operating in the wide-beam mode, according to one aspect of the instant application. The left drawing shows the antenna beam pattern in the horizontal plane, and the right drawing shows the antenna beam pattern in the vertical plane. In this example, the beam width of the antenna in the horizontal plane can be approximately 90°, which is much larger than the beam width of the antenna of a standard Wi-Fi 6E or Wi-Fi 7 AP.

Figure 3:
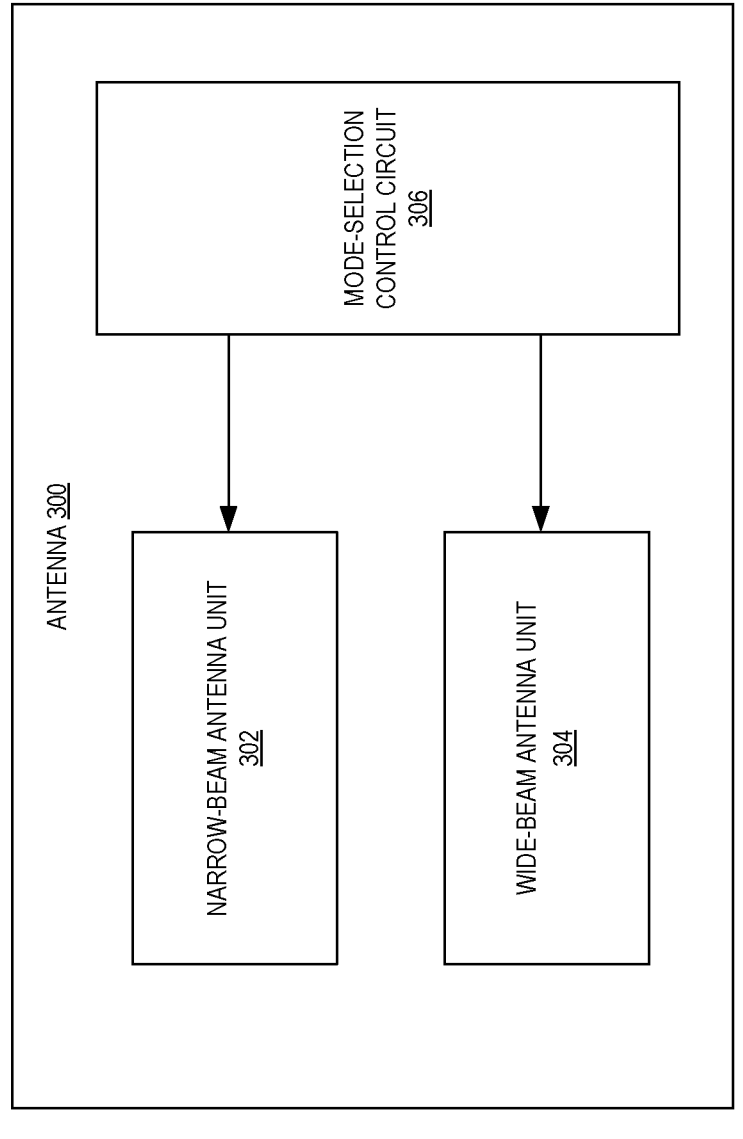
FIG. 3 illustrates an example of the schematic of an antenna with a configurable beam width, according to one aspect of the instant application.

In order to be able to switch between the two operating modes (i.e., the narrow-beam mode and the wide-beam mode), according to some aspects, the antenna of an AP can include a narrow-beam antenna unit and a wide-beam antenna unit. When the AP needs to operate in the narrow-beam mode, the narrow-beam antenna unit can be selected, whereas the wide-beam antenna can be bypassed. When the AP needs to operate in the wide-beam mode, the narrow-beam antenna unit can be bypassed, whereas the wide-beam antenna can be selected. FIG. 3 illustrates an example of the schematic of an antenna with a configurable beam width, according to one aspect of the instant application. In FIG. 3, antenna 300 can include a narrow-beam antenna unit 302, a wide-beam antenna unit 304, and a mode-selection control circuit 306.

Narrow-beam antenna unit 302 can provide a beam pattern that is relatively narrow (e.g., less than 45°) in both the horizontal plane and the vertical plane. According to one aspect, the beam pattern provided by narrow-beam antenna unit 302 in both the horizontal plane and the vertical plane can be approximately 30°. Wide-beam antenna unit 304 can provide a beam pattern that is relatively wide (e.g., more than 60°) in the horizontal plane. According to one aspect, the beam pattern provided by wide-beam antenna unit 304 can be similar to the ones shown in FIG. 2. More specifically, the beam width in the horizontal plane can be approximately 90°, and the beam width in the vertical plane can be approximately 30°.

Mode-selection control circuit 306 can be coupled to both narrow-beam antenna unit 302 and wide-beam antenna unit 304. According to some aspects, mode-selection control circuit 306 can receive a control signal from a remote system (e.g., a network-management system), which can indicate the desired operating mode of antenna 300. More specifically, the network-management system can evaluate the user distribution pattern in the open space and determine whether a particular antenna should be placed in the narrow-beam or wide-beam mode. Responsive to the control signal, mode-selection control circuit 306 can enable or disable a selected antenna unit (i.e., narrow-beam antenna unit 302 or wide-beam antenna unit 304). For example, mode-selection control circuit 306 can control a switching element (not shown in FIG. 3) to route the to-be-transmitted or received RF signals to or from the selected antenna unit. The switching element can be used to configure/change the coupling between the transceiver of the AP and the antenna units. If narrow-beam antenna unit 302 is selected, the transceiver of the AP can be coupled to narrow-beam antenna unit 302 to allow RF signals to be transmitted and received via narrow-beam antenna unit 302. Similarly, if wide-beam antenna unit 304 is selected, the transceiver of the AP can be coupled to wide-beam antenna unit 304 to allow RF signals to be transmitted and received via wide-beam antenna unit 304.

In alternative examples, the output of mode-selection control circuit 306 can be used to turn on or turn off the amplifier(s) coupled to narrow-beam antenna unit 302 or wide-beam antenna unit 304 in order to enable or disable a selected antenna. For example, if the control signal indicates that antenna 300 should operate in the narrow-beam mode, mode-selection control circuit 306 can turn on the amplifier(s) coupled to narrow-beam antenna unit 302 and turn off the amplifier(s) coupled to wide-beam antenna unit 304, and vice versa. Note that the antenna units are passive elements and do not require power to operate. However, the received and to-be-transmitted signals need to be amplified.

Figure 4:
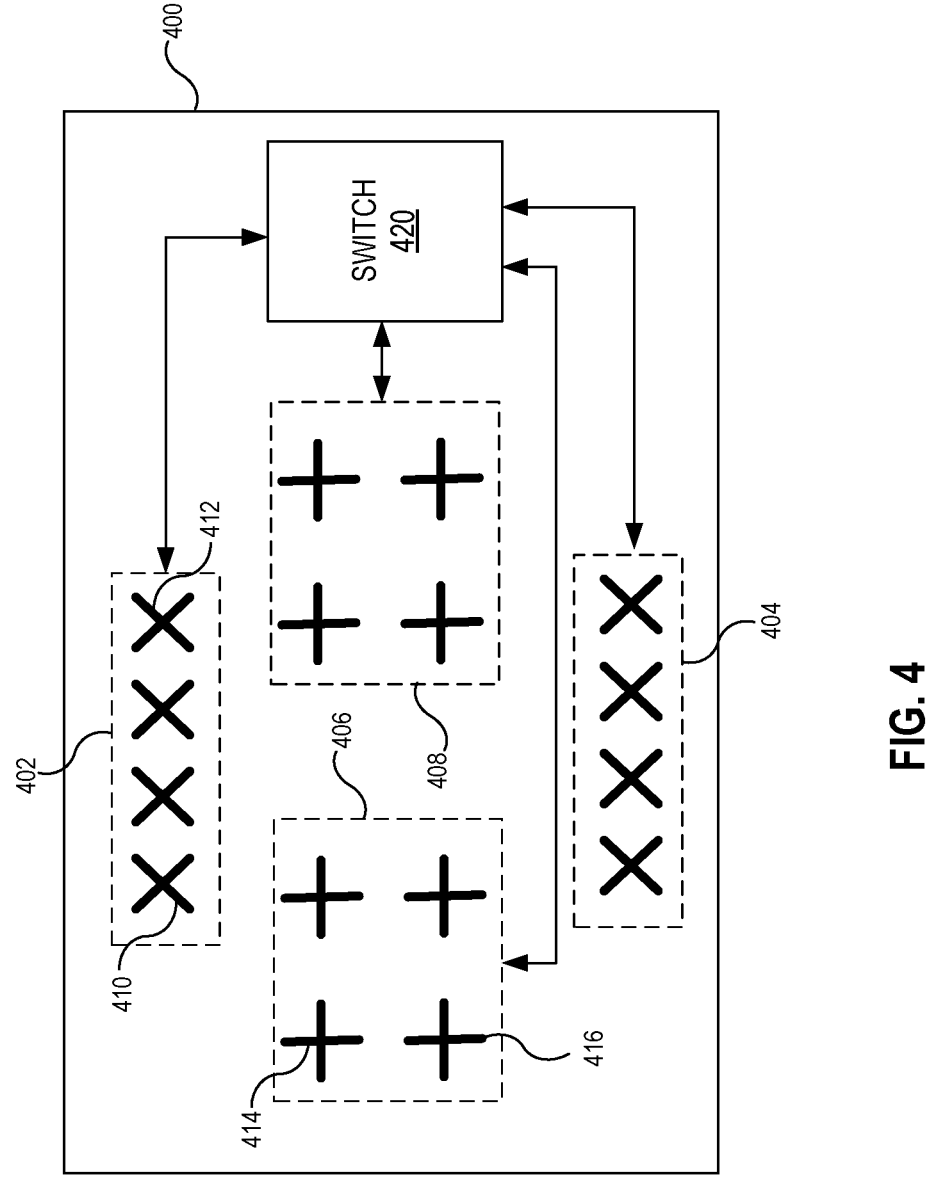
FIG. 4 illustrates an implementation example of the antenna with a configurable beam width, according to one aspect of the instant application.

FIG. 4 illustrates an implementation example of the antenna with a configurable beam width, according to one aspect of the instant application. In FIG. 4, an antenna 400 can include a number of dipole arrays, with each dipole array comprising multiple dipoles arranged into an array format. More specifically, antenna 400 can include a number of one-dimensional (1D) dipole arrays (e.g., 1D dipole arrays 402 and 404) and a number of two-dimensional (2D) dipole arrays (e.g., 2D arrays 406 and 408).

Each 1D array can include multiple dipoles (e.g., dipoles 410 and 412 in 1D array 402) arranged along a straight line. In the example shown in FIG. 4, each 1D dipole array can include four dipoles arranged along a straight line, and the two 1D dipole arrays are arranged to be parallel to each other. These two 1D dipole arrays form a wide-beam antenna unit (e.g., wide-beam antenna unit 304 shown in FIG. 3) that can provide a beam pattern having a relatively wide (e.g., greater than 60°) beam width in the horizontal. In one example, the beam width provided by 1D dipole arrays 402 and 404 can be approximately 90°.

Each 2D array can include multiple dipoles (e.g., dipoles 414 and 416 in 2D array 406) arranged into a matrix format. In the example shown in FIG. 4, each 2D dipole array can include four dipoles arranged into a 2×2 matrix, and the two 2D dipole arrays are arranged adjacent to each other. In this example, 2D dipole arrays 406 and 408 are positioned between 1D dipole arrays 402 and 404. FIG. 4 also shows that the distance between adjacent dipoles (either on the same row or the same column) in a 2D dipole array is much larger than the distance between adjacent dipoles in a 1D dipole array. This can result in the two 2D dipole arrays forming a narrow-beam antenna unit (e.g., narrow-beam antenna unit 302 shown in FIG. 3) that can provide a beam pattern having a relatively narrow (e.g., less than 45°) beam width in the horizontal plane. In one example, the beam width provided by 2D dipole arrays 406 and 408 can be approximately ⅓ of the beam width provided by 1D dipole arrays 402 and 404.

In the example shown in FIG. 4, dipole arrays 402-408 are coupled to a switch 420, which can be controlled by a control logic (not shown in FIG. 4) to connect either the 1D dipole arrays (i.e., arrays 402 and 404) or the 2D dipole arrays (i.e., arrays 406 and 408) to the AP's transceiver (also not shown in FIG. 4). More specifically, depending on the desired operating mode (i.e., the narrow-beam or wide-beam mode) of the AP, switch 420 can connect the desired dipole arrays to the AP's transceiver. According to some aspects of the instant application, a centralized network-management system can determine the user density in the open space (e.g., based on the number of users accessing each AP). The centralized network-management system can then determine the operating mode of each AP based on the user density. If the network-management system determines that an AP is to be placed in the wide-beam mode, it can send a configuration message to the AP. Responsive to the configuration message, the control logic of switch 420 can control switch 420 to connect 1D dipole arrays 402 and 404 to the AP's transceiver. On the other hand, if the network-management system determines that the AP is to be placed in the narrow-beam mode, it can send a corresponding configuration message to the AP. The control logic of switch 420 can then control switch 420 to connect 2D dipole arrays 406 and 408 to the AP's transceiver.

Different antenna designs can also be possible as long as they can provide the desired beam widths. For example, the dipoles can be arranged into formations different from the 1D or 2D arrays shown in FIG. 4. Moreover, in the example shown in FIG. 4, the dipoles form separate arrays to provide the narrow-beam and wide-beam patterns. To reduce the space occupied by the antenna, it may also be possible to arrange the dipoles to form overlapping arrays. For example, certain dipoles can belong to both arrays. This may require the reconfiguration of the wiring. The scope of this disclosure is not limited by the actual design of the antenna itself.

Deploying APs with configurable beams allows the access network to be more energy efficient. As discussed previously, when the user number or user density is high, the network-management system can place all APs in a high-power, narrow-beam mode such that each AP can support a large number of users and provide satisfactory services to the supported users. On the other hand, when the user number or user density is low, the network-management system can selectively place a subset of APs in the deep-sleep or power-saving mode to save energy and place the remaining APs in a high-power, wide-beam mode to maintain Wi-Fi coverage over the entire area.

Figure 5:
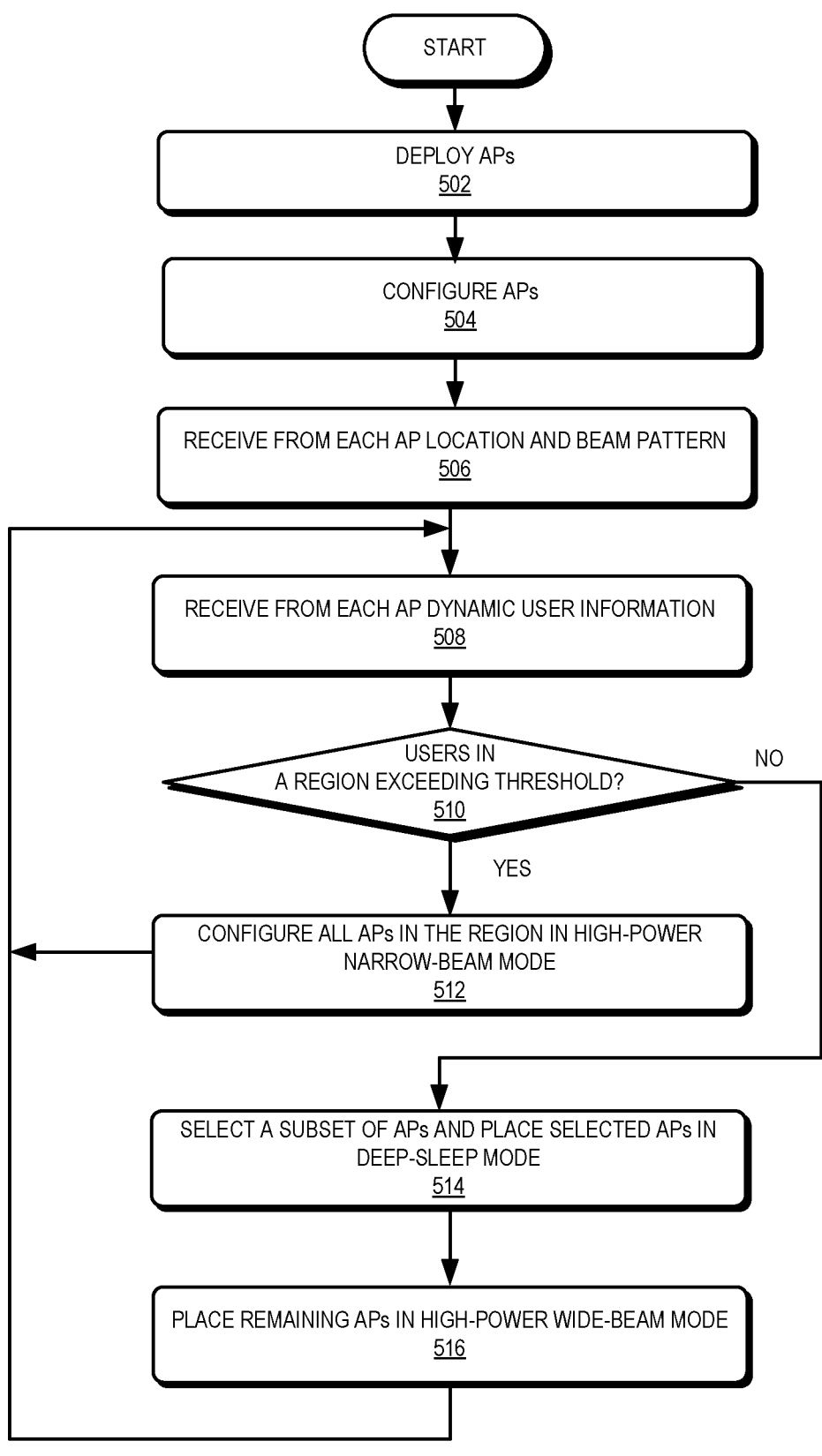
FIG. 5 presents a flowchart illustrating an example of a process for configuring access points (APs), according to one aspect of the instant application.

FIG. 5 presents a flowchart illustrating an example of a process for configuring access points (APs), according to one aspect of the instant application. During operation, a number of APs can be deployed in a large open space (operation 502). The large open space can be an indoor public venue (e.g., a concert hall, a convention center, an indoor sports stadium, a subway station, etc.) or an outdoor public venue (e.g., a plaza, a train terminal, an outdoor sports stadium, etc.) that can hold many users. To ensure that all users can have Wi-Fi access, the number and locations of the APs are determined based on the maximum capacity of the space. In other words, the APs are deployed to support a maximum number of users. For example, if the maximum number of users in an open space is n, and each AP can support up to m users before service deterioration, then the total number of APs deployed into the open space should be equal to or greater than n/m. The position of each AP can also be carefully planned to ensure that full coverage of the space can be provided. Depending on the layout of the space and the predicted user distribution, a centralized network-management system can configure the initial operating mode of the deployed APs (operation 504). For example, it may be determined that fewer APs operating in the wide-beam mode should be deployed surrounding the stage of a concert hall, whereas a greater number of APs operating in the narrow-beam mode should be deployed surrounding the audience seating area.

After deployment and initial configuration/activation of the APs, the centralized network-management system can receive from each AP its location and beam pattern (or heat map) (operation 506). According to some aspects, each AP can be equipped with a Global Positioning System (GPS) receiver, which can receive GPS signals used to determine the precise geographic location of the AP.

The centralized network-management system can also receive, from each AP, dynamic information associated with users accessing the AP (operation 508). According to some aspects, each AP may report such information to the centralized network-management system periodically in predetermined intervals (e.g., every few minutes). Based on information reported by all APs within a particular region, the centralized network-management system can determine whether the number of users currently accessing these APs exceeds a predetermined threshold (operation 510). The predetermined threshold can be selected based on the maximum number of users that can be supported by these APs without service deterioration. In one aspect, the predetermined threshold can be 50% of the maximum number of supported users. The region can be the entire open space or a sub-space within the open space. Using the sports stadium as an example, the region can be a particular seating section.

If the number of users currently accessing the APs in that region exceeds the threshold, the centralized network-management system can configure all APs in that region in the high-power, narrow-beam mode (operation 512). This can provide the maximum coverage over the region. If the number of users currently accessing the APs in that region is below the threshold, the centralized network-management system can select a subset of APs and place the selected APs in the deep-sleep mode (operation 514). The centralized network-management system can also place the remaining APs in the high-power, wide-beam mode (operation 516). Operations 510-516 can be performed for each region within the open space. The various regions in the open space can be defined by the administrator of the access network. According to some aspects, the beam width of the wide-beam antenna can be approximately three times as large as the beam width of the narrow-beam antenna. Accordingly, the centralized network-management system can select approximately ⅔ of the APs within the region to be placed in the deep-sleep mode, thus achieving power savings of over 60%. Other configurations are also possible. In one more example, the beam width of the wide-beam antenna can be approximately twice as large as the beam width of the narrow-beam antenna. Accordingly, the centralized network-management system can select approximately ½ of the APs to be placed in the deep-sleep mode. The centralized network-management system can select APs to be placed in the deep-sleep mode in a manner such that the remaining APs are distributed uniformly in the open space. In the example shown in FIG. 1B, the APs are uniformly divided into groups of three APs, and two APs in each group can be placed in the deep-sleep mode. According to alternative aspects, the centralized network-management system can make such a selection based on the instant distribution or clustering pattern of the users. More particularly, the centralized network-management system can plan the operating mode of the APs to optimize energy savings while meeting the service-coverage requirement (i.e., to ensure all current users can receive satisfactory service).

To place an AP in the deep-sleep mode, the centralized network-management system can send a power-control signal to a power-control unit within the AP, which can then turn off the power to many function blocks (e.g., amplifiers, transmitters, etc.) of the AP. According to one aspect, the only function that remains active in a deep-sleep AP may be a signal-monitoring unit that monitors the arrival of a wakeup signal from the network-management system. To place an AP in the wide-beam mode, the centralized network-management system can send an antenna-mode-control signal to an antenna-mode-selection circuit (e.g., mode-selection control circuit 306 shown in FIG. 3) that can couple the AP's transceiver to the wide-beam antenna within the AP (e.g., wide-beam antenna 304 shown in FIG. 3). The centralized network-management system continuously receives the dynamic information associated with the users accessing each AP (operation 508).

In the example shown in FIG. 5, the centralized network-management system configures the operating mode of the APs based on the instantly detected user distribution pattern. According to alternative aspects, the network-management system may apply a machine-learning technique (e.g., using a pre-trained machine-learning model) to predict the user-distribution pattern and configure the APs according to the predicted user-distribution pattern. In the example of an outdoor plaza (e.g., a shopping plaza), the user-distribution pattern for different times of the day and days of the week can be learned, and the APs can be pre-programmed to operate in a certain power mode (e.g., the high-power mode or power-saving mode) as well as a certain antenna mode (e.g., the narrow-beam mode or the wide-beam mode) based on the learned user-distribution pattern. In the example of a sports stadium or concert hall, the distribution of users may correlate with the type and timing of an event, and a machine-learning model can be trained to learn the time-varying user-distribution pattern for each type of event. More specifically, a model can be trained based on training data (e.g., user-distribution patterns) collected for different types of venues and/or different types of events occurring in the venues.

Figure 6:
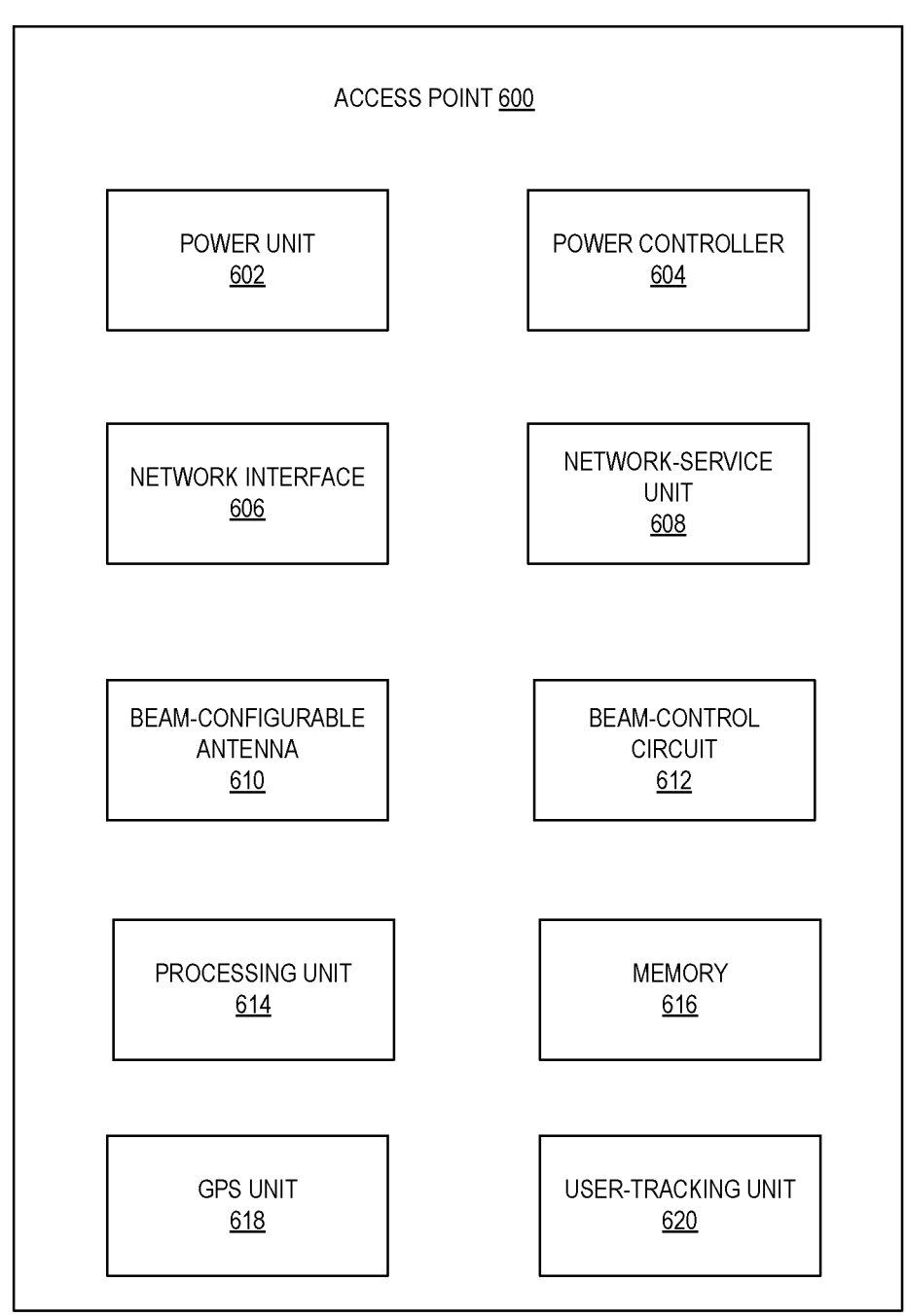
FIG. 6 illustrates an example of the block diagram of an access point (AP), according to one aspect of the instant application.

FIG. 6 illustrates a block diagram of an example of an access point (AP), according to one aspect of the instant application. Note that an actual AP can include many more components than the components shown in FIG. 6. FIG. 6 only shows the components that are involved in the power-saving scheme. In FIG. 6, a wireless access point 600 can include a power unit 602, a power controller 604, a network interface 606, a network-service unit 608, a beam-configurable antenna 610, a beam-control circuit 612, a processing unit 614, a memory 616, a GPS unit 618, and a user-tracking unit 620.

Power unit 602 can be responsible for providing power to various components in AP 600. Power controller 604 can control the operation of power unit 602. For example, power controller 604 can configure power unit 602 to operate in a deep-sleep mode such that it ceases to provide power to most components within AP 600. According to some aspects, power controller 604 can receive an instruction from a centralized network-management system to place AP 600 in either a high-power mode or a power-saving/deep-sleep mode.

Network interface 606 can be responsible for connecting AP 600 to the wired network. AP 600 can communicate with the centralized network-management system via network interface 606. The centralized network-management system can reside in a remote server or in the cloud. Network-service unit 608 can be responsible for providing Wi-Fi services to user devices coupled to access point 600.

Beam-configurable antenna 610 can be similar to antenna 400 shown in FIG. 4 and can provide two different beam patterns in the horizontal plane, a narrow-beam pattern and a wide-beam pattern. According to some aspects, the narrow-beam pattern can have a beam width that is less than 45° (e.g., 30°), and the wide-beam pattern can have a beam width that is more than 60° (e.g., 90°). The beam width in the vertical plane can remain the same for the two beam patterns.

Beam-control circuit 612 can be responsible for configuring beam-configurable antenna 610 and can be similar to mode-selection control circuit 306 shown in FIG. 3. According to some aspects, beam-control circuit 612 can receive an instruction from the centralized network-management system to place beam-configurable antenna 610 in either a narrow-beam mode or a wide-beam mode.

Processing unit 614 can execute an operating system that supports the operations of AP 600 (e.g., facilitating the interactions between AP 600 and the centralized network-management system). Memory 616 can store the instructions that can be loaded into processing unit 614.

GPS unit 618 can be used to determine the geographic location of AP 600, and user-tracking unit 620 can track the number of users coupled to AP 600. The location information and the user information of the APs can be reported to the centralized network-management system, which can then use such information to determine which AP should be placed in the deep-sleep mode and which AP should be placed in the wide-beam mode.

Figure 7:
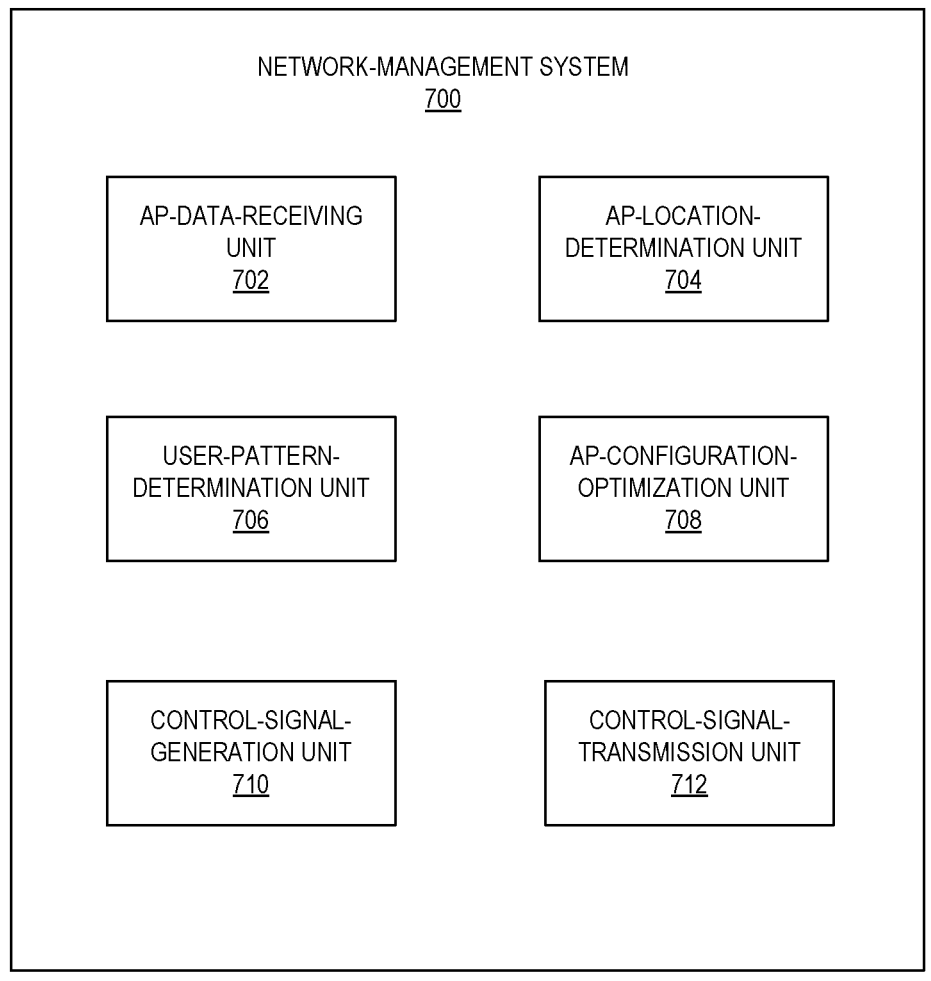
FIG. 7 illustrates an example of the block diagram of a centralized network-management system, according to one aspect of the instant application.

FIG. 7 illustrates a block diagram of an example of a centralized network-management system, according to one aspect of the instant application. Network-management system 700 can be part of a network-operating system that is executed on a centralized server or a cloud-based network-management platform. Network-management system 700 can include an AP-data-receiving unit 702, an AP-location-determination unit 704, a user-pattern-determination unit 706, an AP-configuration-optimization unit 708, a control-signal-generation unit 710, and a control-signal-transmission unit 712.

AP-data-receiving unit 702 can receive location and dynamic user information from each AP coupled to and managed by network-management system 700. The location information of each AP can be obtained by the GPS device equipped in each AP. According to some aspects, AP-data-receiving unit 702 can receive the location information from an AP after the deployment of the AP in an open space. AP-data-receiving unit 702 can receive dynamic information of users in the open space from each AP periodically at predetermined time intervals (e.g., every few minutes).

AP-location-determination unit 704 can determine the location of each AP based on the location information received from the APs. According to some aspects, AP-location-determination unit 704 can generate a map that indicates the location and current beam pattern of each AP. User-pattern-determination unit 706 can determine the distribution-pattern of users in the open space based on the user information reported by each AP. Due to the dynamic nature of the user-distribution pattern, user-pattern-determination unit 706 can update the determined user-distribution pattern dynamically. According to alternative aspects, user-pattern-determination unit 706 can use a machine-learning technique to learn the user-distribution pattern over time and to predict the user-distribution pattern based on the learning result. More specifically, user-pattern-determination unit 706 can apply a machine-learning technique to predict a user-distribution pattern based on the type of the space and/or an event occurring in the space.

AP-configuration-optimization unit 708 can be responsible for optimizing the overall energy use in the network while providing sufficient and satisfactory services to users in the open space. More particularly, AP-configuration-optimization unit 708 can determine which AP can be placed in the power-saving mode without causing service deterioration. Note that placing one AP in a power-saving mode also requires the neighboring AP(s) to be placed in a wide-beam mode. According to some aspects, when the user density in a particular region is low, one wide-beam AP may be used to replace three narrow-beam APs (i.e., two of the three APs can be placed in the power-saving mode), thus providing power savings of over 60%. According to one aspect, AP-configuration-optimization unit 708 can generate an AP-configuration plan that specifies the operating mode of each AP in the network. The AP-configuration plan can be updated dynamically based on the user-distribution pattern.

Control-signal-generation unit 710 can generate control signals that can be used to configure the APs based on the output of AP-configuration-optimization unit 708 (e.g., the AP-configuration plan). The control signals can include a power-control signal that can be sent to an AP to place the AP in a power-saving or high-power mode and an antenna-mode-control signal that can be sent to the AP to configure the AP's antenna to operate either in a narrow-beam mode or a wide-beam mode. Note that once an AP is placed in the power-saving mode, the antenna mode of the AP becomes irrelevant as the AP will not service users. Control-signal-transmission unit 712 can transmit the power-control signals and the antenna-mode-control signals to corresponding APs.

Figure 8:
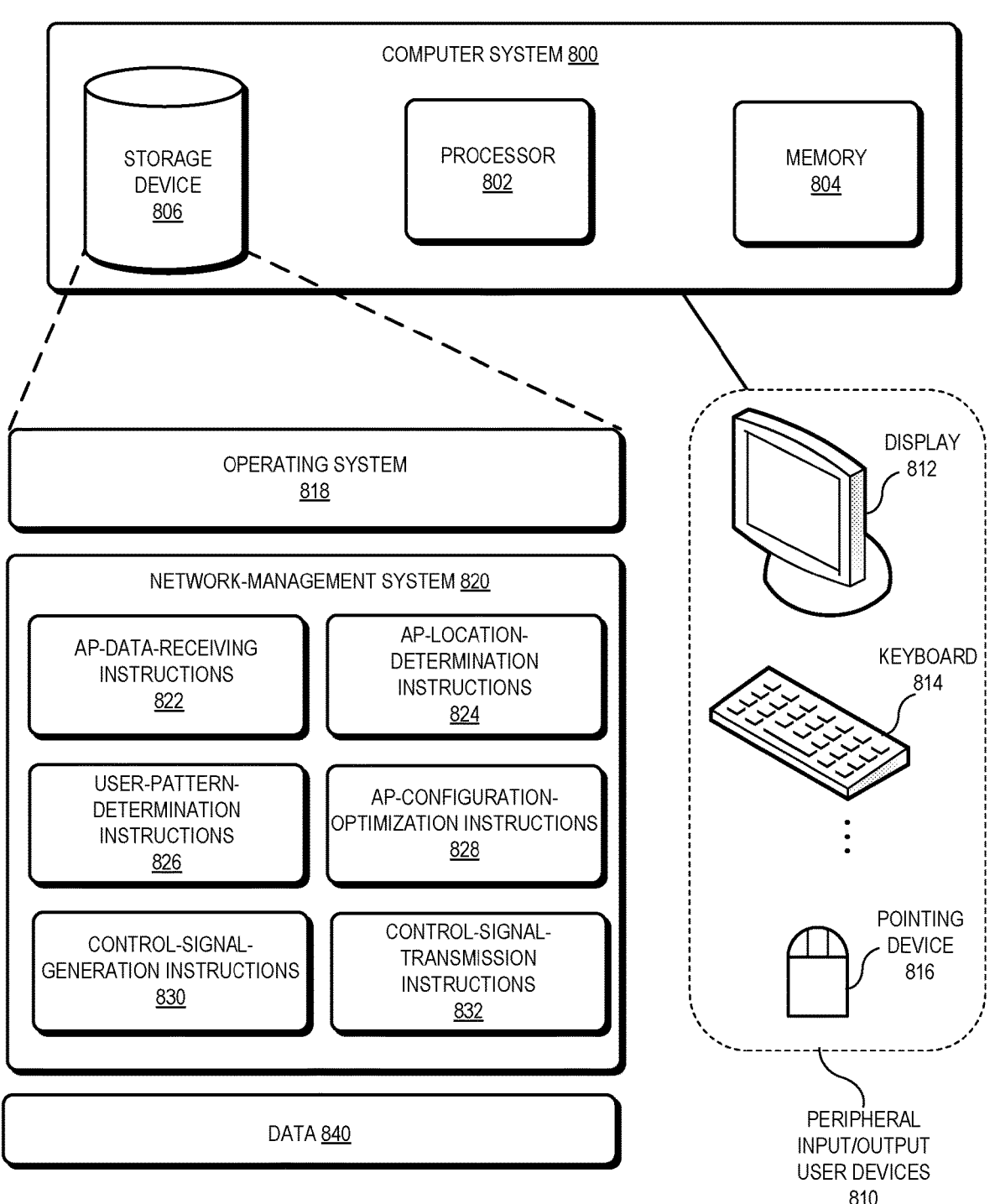
FIG. 8 illustrates an example of a computer system that facilitates the configuration of access points, according to one aspect of the instant application.

FIG. 8 illustrates an example of a computer system that facilitates the configuration of access points, according to one aspect of the instant application. Computer system 800 can include a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, a network-management system 820, and data 840.

Network-management system 820 can include instructions, which when executed by computer system 800, can cause computer system 800 or processor 802 to perform methods and/or processes described in this disclosure. Specifically, by executing these instructions, computer system 800 can implement the various functionalities for the dynamic configuration of a number of Wi-Fi APs deployed in an open space. Network-management system 820 can include instructions for receiving location and user data from APs (AP-data-receiving instructions 822), instructions for determining the location of each AP based on the location data from the APs (AP-location-determination instructions 824), instructions for determining the user-distribution pattern based on the user data from the APs (user-pattern-determination instructions 826), instructions for determining the configurations of the APs that can optimize the energy usage without causing service deterioration (AP-configuration-optimization instructions 828), instructions for generating control signals that can be sent to the APs to configure each AP to operate in the desired mode of operation (control-signal-generation instructions 830), and instructions for transmitting the control signals to the APs (control-signal-transmission instructions).

In general, the disclosure describes a method and system for dynamic configuration of APs deployed in an open space in order to reduce energy waste. Each AP can include a beam-configurable antenna that can either operate in a narrow-beam mode or a wide-beam mode. When an AP's antenna is operating in the narrow-beam mode, the AP can support many users occupying a relatively small area. Having all APs operating in the narrow-beam mode can provide service to a maximum number of users but may be power consuming. When an AP's antenna is operating in the wide-beam mode, the AP can support roughly the same number of users but over a much larger area, thus making it possible to place its neighboring APs in a power-saving or deep-sleep mode. During operation, a network-management system can receive location and user information from each deployed AP in order to map out the user-distribution pattern. Based on the user-distribution pattern, the network-management system can generate an AP-configuration plan that specifies a number of APs being placed in the power-saving mode and a number of APs being placed in the wide-beam mode, thus reducing the overall power usage of the network while continuing to provide satisfactory Wi-Fi services to current users.

One aspect can provide a system and method for configuring a plurality of wireless access points (APs) providing service coverage to a space. During operation, the system can determine a number of users in the space. In response to the number of users exceeding a predetermined threshold, the system can place the plurality of APs in a high-power mode and cause an antenna of each AP to operate in a narrow-beam mode. In response to the number of users being below the predetermined threshold, the system can select a subset of APs from the plurality of APs and cause an antenna of each AP in the subset to operate in a wide-beam mode. Each AP in the subset remains in the high-power mode, and the wide-beam mode has a wider radiation pattern in a horizontal plane than the narrow-beam mode. The system can place the remaining APs in a power-saving mode, thereby reducing energy consumption while maintaining service coverage.

In a variation on this aspect, the radiation pattern in the horizontal plane of the wide-beam mode can be three times as wide as that of the narrow-beam mode.

In a further variation, selecting the subset of APs comprises selecting ⅓ of the APs from the plurality of APs.

In a variation on this aspect, determining the number of users can include receiving, from each AP, information associated with users coupled to the AP.

In a further variation, the system can receive, from each AP, location information associated with the AP and generate an AP-configuration plan based on the received information associated with the users coupled to each AP and the location information associated with each AP.

In a variation on this aspect, the space can include a large indoor public venue or a large outdoor public venue.

In a further variation, determining the number of users in the space comprises applying a machine-learning technique to predict a user-distribution pattern based on a type of the venue and/or an event occurring in the venue.

In a variation on this aspect, placing an AP in the power-saving mode can include sending a control signal to a power unit on the AP to cause the power unit to stop providing power to a number of components in the AP.

In a variation on this aspect, the antenna of each AP can include a wide-beam antenna, a narrow-beam antenna, and a mode-selection circuit; causing the antenna to operate in the narrow-beam or wide-beam mode can include sending a control signal to the mode-selection circuit to activate a corresponding wide-beam or narrow-beam antenna.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for configuring a plurality of wireless access points (APs) providing service coverage to a space, the method comprising:
    determining a number of users in the space;
    in response to the number of users exceeding a predetermined threshold, placing the plurality of APs in a high-power mode and causing an antenna of each AP to operate in a narrow-beam mode; and
    in response to the number of users being below the predetermined threshold:
        selecting a subset of APs from the plurality of APs and causing an antenna of each AP in the subset to operate in a wide-beam mode, wherein each AP in the subset remains in the high-power mode, and wherein the wide-beam mode has a wider radiation pattern in a horizontal plane than the narrow-beam mode; and
        placing the remaining APs in a power-saving mode, thereby reducing energy consumption while maintaining service coverage,
    wherein the plurality of APs collectively provide service coverage to an entirety of the space when the antenna of each AP operates in the narrow-beam mode, and wherein the subset of APs collectively provide service coverage to the entirety of the space when the antenna of each AP of the subset of APs operates in the wide-beam mode.

2. The method of claim 1, wherein the radiation pattern in the horizontal plane of the wide-beam mode is three times as wide as that of the narrow-beam mode.

3. The method of claim 2, wherein selecting the subset of APs comprises selecting ⅓ of the APs from the plurality of APs.

4. The method of claim 1, wherein determining the number of users comprises receiving, from each AP, information associated with users coupled to the AP.

5. The method of claim 4, further comprising:
    receiving, from each AP, location information associated with the AP; and
    generating an AP-configuration plan based on the received information associated with the users coupled to each AP and the location information associated with each AP.

6. The method of claim 1, wherein the space comprises a large indoor public venue or a large outdoor public venue.

7. The method of claim 6, wherein determining the number of users in the space comprises applying a machine-learning technique to predict a user-distribution pattern based on a type of the venue and/or an event occurring in the venue.

8. The method of claim 1, wherein placing an AP in the power-saving mode comprises sending a control signal to a power unit on the AP to cause the power unit to stop providing power to a number of components in the AP.

9. The method of claim 1,
    wherein the antenna of each AP comprises a wide-beam antenna, a narrow-beam antenna, and a mode-selection circuit; and
    wherein causing the antenna to operate in the narrow-beam or wide-beam mode comprises sending a control signal to the mode-selection circuit to activate a corresponding wide-beam or narrow-beam antenna.

10. A computer system, comprising:

a processor;

a memory storing instructions that when executed by the processor cause the processor to perform a method for configuring a plurality of wireless access points (APs) providing service coverage to a space, the method comprising:

determining a number of users in the space;

in response to the number of users exceeding a predetermined threshold, placing the plurality of APs in a high-power mode and causing an antenna of each AP to operate in a narrow-beam mode; and in response to the number of users being below the predetermined threshold:

selecting a subset of APs from the plurality of APs and causing an antenna of each AP in the subset to operate in a wide-beam mode, wherein each AP in the subset remains in the high-power mode, and wherein the wide-beam mode has a wider radiation pattern in a horizontal plane than the narrow-beam mode; and placing the remaining APs in a power-saving mode, thereby reducing energy consumption while maintaining service coverage, wherein the plurality of APs collectively provide service coverage to an entirety of the space when the antenna of each AP operates in the narrow-beam mode, and wherein the subset of APs collectively provide service coverage to the entirety of the space when the antenna of each AP of the subset of APs operates in the wide-beam mode.

11. The computer system of claim 10, wherein the radiation pattern in the horizontal plane of the wide-beam mode is three times as wide as that of the narrow-beam mode.

12. The computer system of claim 10, wherein the method further comprises:

receiving, from each AP, information associated with users coupled to the AP;

receiving, from each AP, location information associated with the AP; and generating an AP-configuration plan based on the received information associated with the users coupled to each AP and the location information associated with each AP.

13. The computer system of claim 10, wherein the space comprises a large indoor public venue or a large outdoor public venue; and wherein determining the number of users in the space comprises applying a machine-learning technique to predict a user-distribution pattern based on a type of the venue and/or an event occurring in the venue.

14. The computer system of claim 10, wherein placing an AP in the power-saving mode comprises sending a control signal to a power unit on the AP to cause the power unit to stop providing power to a number of components in the AP.

15. The computer system of claim 10, wherein the antenna of each AP comprises a wide-beam antenna, a narrow-beam antenna, and a mode-selection circuit; and wherein causing the antenna to operate in the narrow-beam or wide-beam mode comprises sending a control signal to the mode-selection circuit to activate a corresponding wide-beam or narrow-beam antenna.

16. A system for providing Wi-Fi coverage to a space, the system comprising:

a plurality of access points (APs); and a network-management system coupled to the plurality of APs;

wherein each AP comprises a beam-configurable antenna capable of operating in a wide-beam mode or a narrow-beam mode, the wide-beam mode having a wider radiation pattern in a horizontal plane than the narrow-beam mode; and wherein the network-management system comprises a logic to:

determine a number of users in the space;

in response to the number of users exceeding a predetermined threshold, place the plurality of APs in a high-power mode and configure the antenna of each AP to operate in the narrow-beam mode; and in response to the number of users being below the predetermined threshold:

select a subset of APs from the plurality of APs and configure the antenna of each AP in the subset to operate in the wide-beam mode, wherein each AP in the subset remains in the high-power mode; and place the remaining APs in a power-saving mode, thereby reducing energy consumption while maintaining service coverage, wherein the plurality of APs collectively provide service coverage to an entirety of the space when the antenna of each AP operates in the narrow-beam mode, and wherein the subset of APs collectively provide service coverage to the entirety of the space when the antenna of each AP of the subset of APs operates in the wide-beam mode.

17. The system of claim 16, wherein the logic is to:

receive, from each AP, information associated with users coupled to the AP;

receive, from each AP, location information associated with the AP; and generate an AP-configuration plan based on the received information associated with the users coupled to each AP and the location information associated with each AP.

18. The system of claim 16, wherein the space comprises a large indoor public venue or a large outdoor public venue; and wherein determining the number of users in the space comprises applying a machine-learning technique to predict a user-distribution pattern based on a type of the venue and/or an event occurring in the venue.

19. The system of claim 16, wherein the radiation pattern in the horizontal plane of the wide-beam mode is three times as wide as that of the narrow-beam mode; and wherein selecting the subset of APs comprises selecting ⅓ of the APs from the plurality of APs.

20. The method of claim 1, wherein the plurality of APs are uniformly distributed with in the space, wherein the method further comprises:

dividing the plurality of APs into a plurality of groups, wherein selecting the subset of APs from the plurality of APs comprises selecting an AP from each of the plurality of groups.

* * * * *